United States Patent [19]

Zoueki

[11] Patent Number: 4,541,760
[45] Date of Patent: Sep. 17, 1985

[54] APPARATUS FOR DRILLING, ENGRAVING AND CARVING OPHTHALMIC LENSES

[76] Inventor: Georges Zoueki, 4812 av. Verdun, Verdun, Quebec, Canada, H4G 1N1

[21] Appl. No.: 633,513

[22] Filed: Jul. 23, 1984

[30] Foreign Application Priority Data

Jun. 18, 1984 [CA] Canada ................................ 456824

[51] Int. Cl.[4] ............................................. B23C 3/12
[52] U.S. Cl. ..................................... 409/137; 51/102; 51/128; 51/273; 408/26; 409/218; 409/226
[58] Field of Search ............. 29/26 B, 26 A; 409/137, 409/219, 220, 225, 226, 229, 218; 51/102, 128, 125, 98 R, 273, 51; 144/253 B, 134 A; 408/20, 26

[56] References Cited

U.S. PATENT DOCUMENTS

| | | | |
|---|---|---|---|
| 2,188,585 | 1/1940 | Williams | 51/102 X |
| 2,544,880 | 3/1951 | Hindle et al. | 51/102 |
| 2,997,817 | 8/1961 | Branch | 51/125 |
| 3,769,755 | 11/1973 | Kania et al. | 51/101 LG |
| 3,782,042 | 1/1974 | Strasbaugh | 51/58 |
| 3,905,273 | 9/1975 | Shook | 409/137 X |
| 3,977,127 | 8/1976 | Mahnken | 51/5 R |
| 4,182,589 | 1/1980 | Boudreault et al. | 409/226 |
| 4,233,782 | 11/1980 | Perrault | 51/5 R |
| 4,376,603 | 3/1983 | Hudgins | 409/226 X |

FOREIGN PATENT DOCUMENTS

| | | | |
|---|---|---|---|
| 595962 | 6/1959 | Italy | 51/102 |
| 712598 | 9/1966 | Italy | 51/125 |
| 2073065 | 10/1981 | United Kingdom | 51/101 LG |

OTHER PUBLICATIONS

"Step by Step Operation for Tulip Design Faceting".
Essilor S.A. of France, "Groover and Rimless Mounting Tool".
Vigor Encyclopedia of Optical Tools and Supplies, BK-702.
Coburn's Special Catalogue for the Dispenser.
William Dixon Company, Dixon Equipment, Tools and Supplied for Optical Laboratories.

Primary Examiner—William R. Briggs
Attorney, Agent, or Firm—Robic, Robic & Associates

[57] ABSTRACT

A multipurpose apparatus for drilling, engraving and carving ophthalmic lenses. The apparatus comprises a base in which is mounted an electrical motor, and a tool holder is connected to the shaft of the motor for detachably mounting a drilling, engraving or carving end mill above the upper surface of the base. A working support is also mounted on the upper surface of the base for maintaining and supporting the lenses in the various positions in which they must stand in order to be easily drilled, engraved or carved. The working support comprises a platform detachably mounted onto the upper surface of the base, and a guide holder rigidly mounted onto the platform in parallel relationship with respect to the tool holder. The support also comprises a L-shaped tube having one end fitted into a central hole provided in the platform for giving room to the tool holder, and the other end connected to the guide holder. The tube has an upwardly extending portion with an internal diameter and a height sufficient to receive the tool holder while allowing the end mill mounted thereon to project outwardly from the tube through a small opening. The tube also has a perpendicularly extending portion from the upper surface of which projects the end mill, this upper surface being useful for supporting a lens when the same is drilled, engraved or carved with the end mill. The apparatus may advantageously be connected to a vacuum source for sucking out particles resulting from the drilling, carving or engraving operation through the small opening from which projects end mill and the upwardly expanding portion of the L-shaped tube. The apparatus may also comprise one or more lens guides adjustably mounted onto the guide holder for laterally guiding or retaining the lenses with respect to the end mill.

20 Claims, 6 Drawing Figures

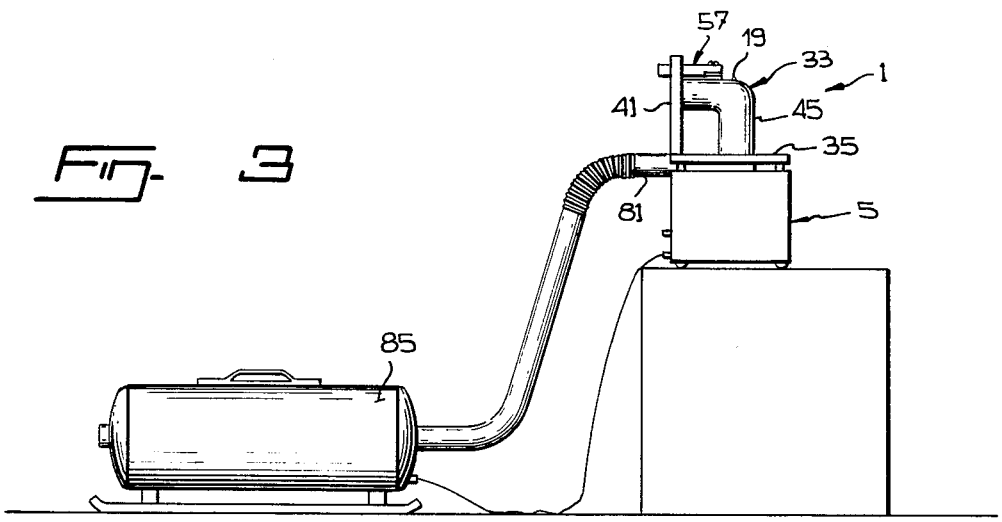
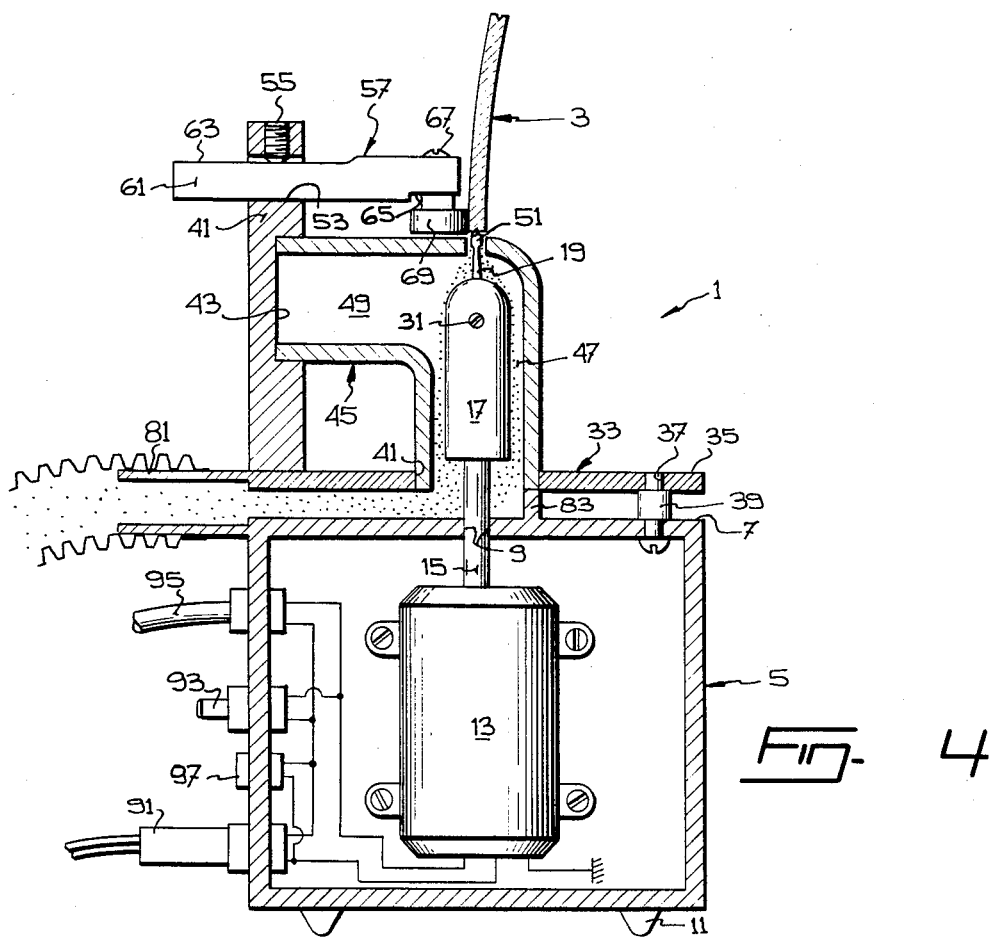

APPARATUS FOR DRILLING, ENGRAVING AND CARVING OPHTHALMIC LENSES

BACKGROUND OF THE INVENTION

(a) Field of the Invention

The present invention relates to a multipurpose apparatus for use by opticians and optical laboratory technicians, to drill, groove, engrave and carve ophtalmic lenses made of organic or mineral materials.

The invention also relates to a multipurpose apparatus of the above mentioned type, that can also be used for polishing lenses whenever necessary.

(b) Brief Description of the Prior Art

Numerous apparatuses are already known and commonly used by the opticians and optical laboratory technicians, to manufacture, repair and/or shape to any style glass or plastic lenses. These apparatuses are used, for example, to cut lenses for reducing their surface areas, to facet the endges of the lenses, to longitudinally groove or laterally slot these edges when a rimless mounting is desired, to drill fixation holes, to engrave an initial or a number and, of course, to polish, mill and/or finish the so manufactured lenses.

The major problem presently encountered by the opticians is that all the existing apparatuses, machines and tools are capable of performing one task only. As a result every optician must have a substantial number of different machines in his or her lab to be capable of satisfying all of his or her clients' requirements. Of course, this particular need substantially increases the capital investment of every optician or optical laboratory.

To obviate the above mentioned problem, a multipurpose machine has already been devised and is presently sold under the trademark PRO-CRAFT flex-shaft machine by the William Dickson Co. of Carlstatt, N.J. This PRO-CRAFT machine can be used for small drilling, polishing, burring, milling, slotting, sawing, buffing, grinding or countersinking of lenses. However, a problem with this particular machine is that it does not incorporate or provide any kind of support for maintaining and/or holding the lenses in the various positions in which they must stand in order to be easily drilled, polished, carved grooved or slotted.

SUMMARY OF THE INVENTION

The object of the present invention is to provide a multipurpose apparatus for use by opticians or optical laboratory technicians to either drill, engrave or carve ophtalmic lenses in a very efficient and convenient manner, due to the presence of a particularly well designed working support capable of retaining and maintaining the lenses while they are worked.

The apparatus for drilling, engraving and carving ophtalmic lenses according to the invention basically comprises:

(a) a base having an upper surface provided with an opening;
(b) an electrical motor mounted in the base for rotating a shaft through the base opening;
(c) a tool holder for detachably mounting a drilling, engraving or carving end mill onto the rotatable shaft above the surface of the base; and
(d) a working support detachably mounted on the upper surface of the base for holding and maintaining the lenses while they are worked.

In accordance with the invention, this working support includes:

a platform provided with a central hole wide enough to give room to the tool holder;
means for detachably mounting the platform on and parallel to, the upper surface of the base with the tool holder passing through the central hole of the platform;
a guide holder rigidly mounted onto the platform in such a manner as to extend upwardly in parallel relationship with respect to the tool holder; and
a L-shaped tube having one end fitted into the central hole of the platform and on the other end rigidly connected to the guide holder. The tube has an upwardly extending portion with an internal diameter and a height sufficient to receive the tool holder while allowing the end mill mounted thereto to project upwardly from the tube through a small opening provided therein. The tube also has a perpendicularly extending portion with an upper surface from which projects the end mill. This upper surface of the perpendicularly extending portion is particularly interesting in that it can be used as a support for a lens while the same is drilled, engraved or carved with the end mill.

Advantageously, the tool holder includes means for adjusting the height from which the end mill projects outwardly from the upper surface of the L-shaped tube. This feature makes it possible to adjust the depth of the cut in the worked lenses.

In accordance with the preferred embodiment of the invention, means are provided for holding the platform of the working support in spaced apart position with respect to the upper surface of the base. Means connectable to a vacuum source such as, for example, a domestic vacuum cleaner, may also be provided for sucking out particles resulting from the drilling, carving or engraving operation through the small opening from which projects the end mill and the upwardly extending portion of the L-shaped tube. This particular feature makes the apparatus according to the invention very clean in use.

A plug may be provided for electrically connecting the vacuum source to the same electrical supply as the electrical motor. On the other hand, a foot pedal can be used for controlling the electrical supply of the motor, thereby making it possible for the operator to activate the motor whenever desired while keeping both hands free to hold the worked lens.

In accordance with another preferred embodiment of the invention, the guide holder is provided with a hole bored therethrough at a short distance above and parallel to the perpendicularly extending portion of the L-shaped tube, for receiving and positioning an adjustable lens drilling or lens engraving or carving guide. The adjustable lens engraving and carving guide may comprise a free rotating NYLON ® wheel fixed to one end of a supporting rod detachably mounted in the hole in the guide holder. The adjustable lens drilling guide may comprises a small plate pivotably connected to one end of a supporting rod detachably mounted in the hole of the guide holder. Each of the guides may be used whenever necessary, to laterally position the worked lens with respect to the end mill, thereby making the apparatus according to the invention as efficient as any of the existing apparatuses or machines used for drilling, carving or engraving ophtalmic lenses.

BRIEF DESCRIPTION OF THE DRAWINGS

The invention and its numerous advantages will be better understood upon reading on the following, non-restrictive description of a preferred embodiment thereof even with reference to the accompanying drawings in which:

FIG. 3 is a side elevational view of the apparatus shown in FIG. 1, connected to a vacuum cleaner;

FIG. 4 is a cross-sectional, elevational view of the apparatus shown in FIGS. 1 to 3;

DESCRIPTION OF THE PREFERRED EMBODIMENT OF THE INVENTION

Figure 1:
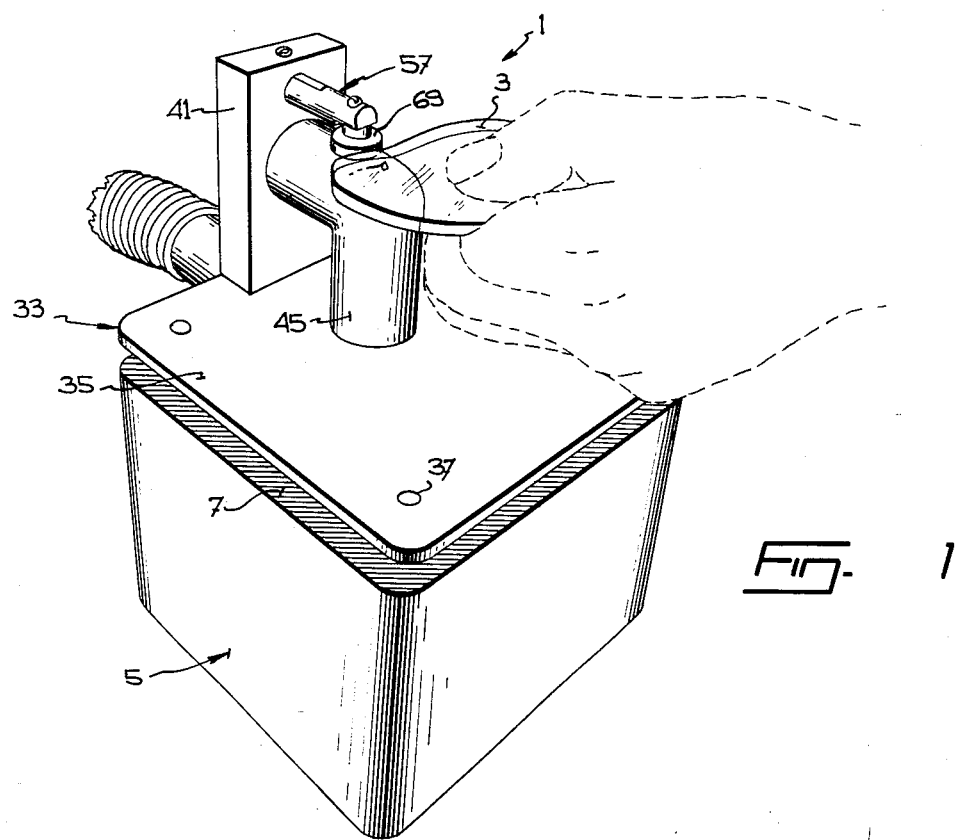
FIG. 1 is a perspective view of an apparatus according to the invention, in use for carving a groove onto the surface of a lens close to the periphery thereof.

As shown in the accompanying drawings, the apparatus 1 according to the invention for drilling, engraving or carving ophtalmic lenses 3 comprises a base 5 having a flat, upper surface 7 provided with a small opening 9 (see FIG. 4). The base 5 may consist of the cubic box with 0.22 inch thick wall made of a flame retardant material. The box 5 may be mounted on short legs 11 preferably made of rubber or any similar material.

The box-shaped base 5 encloses an electrical motor 13 capable of rotating a shaft 15 extending upwardly from the base 5 through the small opening 9 of the upper surface 7 of the base. To avoid mechanical transmission, the shaft 15 is advantageously the central, ball bearing shaft of the motor 13. This motor may have a diameter of 3.3 inches and a height of 4.5 inches.

A tool holder 17 is provided for detachably mounting a drilling engraving or carving end mill 19 directly onto, and in alignment with, the rotatable shaft 15 above the upper surface of the base. The tool holder 17 is preferably made of a cylindrically shaped piece of brass provided with a flat bottom 21 and a rounded top 23 (see FIG. 5). An elongated hole 25 is longitudinally drilled in the holder 17 in the middle of its bottom 21 to fit the motor shaft 15. Another longitudinal hole 27 is longitudinally drilled in the middle of the top 23 of the holder 17 to receive the stem of any kind of end mills 19 to be used. A set-screw 29 is mounted in a threaded hole perpendicular to the shaft receiving hole 25 to rigidly connect the holder 17 to the motor shaft 15. Similarly, another set-screw 31 is mounted in another threaded hole perpendicular to the end mill receiving hole 27 to detachably fix the stem of a end mill 19 to the holder 17.

The end mill 19 that are used in the apparatus 1 may be of any type and structure. By a way of example, use can be made of engraving or carving end mills, of pyramidal head end mills for drilling in glass, or of rounded head end mills for drilling in plastic.

The brass holder 17 may be 2.5 inches long and have a diameter of 0.75 inch. The axial, shaft receiving hole 25 may have a 5/16 inch diameter. The end mill receiving hole 27 may have a 3/32 inch diameter. Both set screws 29 and 31 may be No. 10/32. Both of these set screws are preferably selected to be mounted with an ALLEN key.

As can be easily understood, the structure of the tool holder 17 makes it possible to very easily change, interchange or replace the end mills whenever necessary. This structure makes it possible also adjust the height to which projects the end mill 19 inserted in the hole 27.

In accordance with the invention, the apparatus 1 further comprises a working support 33 detachably mounted on the upper surface of the base 5 to maintain support and guide the lenses 3 when the same are drilled, engraved or carved with the end mill 19.

The working support 33 comprises a platform 35 capable of being detachably mounted on, and parallel to, the upper surface 7 of the base at the short distance therefrom. For this purpose, the platform 35 has a hole 37 in every corner. Every hole 37 matches a short, projecting step 39 provided in the corresponding corner of the upper surface 7. The holes 37 are sized to be snapped in their corresponding steps 39 (see FIG. 4).

The platform 35 also comprises a central hole 41 positioned so that its center matches exactly with the axis of the shaft 15 of the motor. The central hole 41 is sized to give room to the tool holder 17 when the platform 35 is mounted onto the base 5. For this purpose, the central hole 41 may have, for example, a 1.25 inch diameter.

The platform 35 supports a vertically extending guide holder 41 positioned adjacent to one of its edge. The guide holder 41 is preferably made of an aluminum block 2 inches wide, 0.75 inch thick and 3.60 inches high. This block may be fixed to the platform 35 by means of machine screws fitting into corresponding threaded holes bored in the bottom surface of the aluminum block.

The guide holder 41 is provided in the upper part of its front surface with a blind hole 43 having a diameter of 1.250 inches. The purpose of this hole is to receive and rigidly hold the end of a L-shaped tube 45, the other end of this tube being fitted into the central hole 41 of the platform 35. The tube 45 which is preferably made of NYLON has an upwardly extending portion 47 and a perpendicularly extending portion 49. As aforesaid, the lower end of the upwardly extending portion fits the central hole 41 of the platform. Similarly, the end of the perpendicularly extending portion 49 fits snuggly the hole 43 provided in the guide holder 41. The internal diameter of the tube 45 and the height of its upwardly extending portion 47 are selected to be sufficient to give room and receive the tool holder 17 while allowing the end mill 19 mounted thereto to project outwardly from the tube through a small opening 51 having a diameter of, for example, ⅛ inch. The small opening 51 is drilled to allow only the top of the end mill 19 to pass therethrough. Its diameter is also selected to allow adjustment of the depth of the cut by raising up or lowering the tip of the end mill 19 which is used. Such an adjustment can be made by mere adjustment of the height from which the endless mill 19 project outwardly from its receiving hole 27 in the tool holder 17, using the set screws 31 for this purpose.

As can now be easily understood, the upper surface of the perpendicularly extending portion 49 of the L-shaped tube 45 is particularly interesting in that it provides a rigid support to a lens 3 when the same is drilled, engraved or carved with the end mill 19. Indeed, the lens 3 cannot go any lower than the upper surface of the L-shaped tube which thus acts as a stop.

As can also be easily understood, a main advantage of the above mentioned structure is that the working support 33 as a whole, including the platform 35, the guide holder 41 and the L-shaped tube 45 can be inserted, removed and reinserted in one step only when it is necessary to adjust or change the operating end mill. This feature makes the apparatus 1 very convenient in use and easy to operate.

Advantageously, the guide holder 41 is provided with a through hole 53 (see FIG. 4) having a diameter of ½ inch to receive and position an adjustable lens guide. The hole 53 extends parallel to the hole 43 and is positioned at the short distance above it. A set-screw 55 is mounted in a threaded hole perpendicular to the hole 53 to intercept it.

Figure 5:
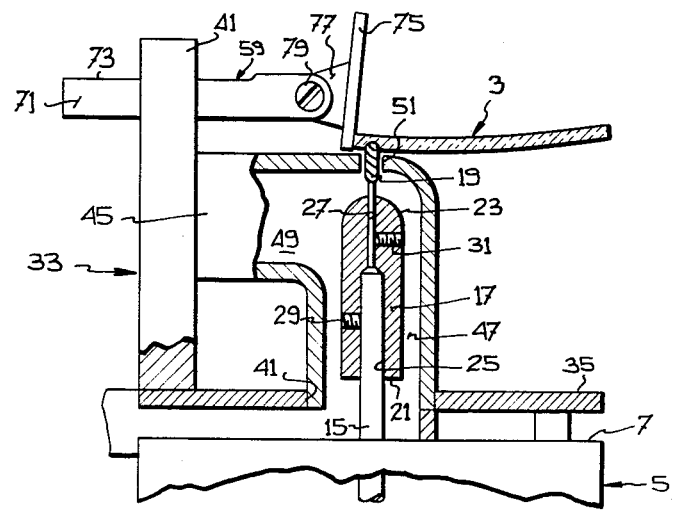
FIG. 5 is a cross-sectional, elevational view of the apparatus shown in FIGS. 1 to 4, with an adjustable lens drilling guide
Figure 6:
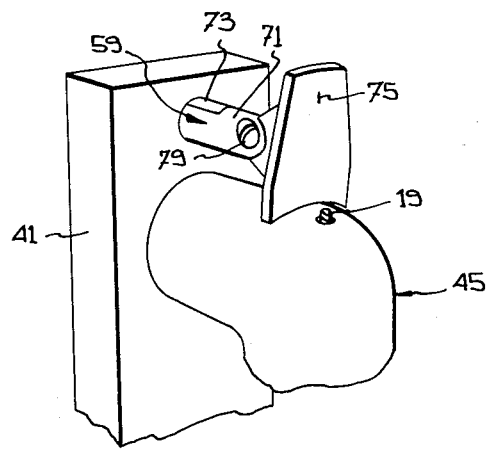
FIG. 6 is a detailed, perspective view of the guide holder and the adjustable lens drilling guide of the apparatus shown in FIG. 5.

The hole 53 is intended to receive an adjustable lens graving or carving guide 57, as shown in FIGS. 1, 3 and 4 or, alternatively, an adjustable lens drilling guide 59 as shown in FIGS. 5 and 6.

The adjustable lens graving and carving guide 57 comprises an aluminum 3 inches long rod 61 having a diameter of 0.5 inch to make it capable of being inserted into the hole 53. The rod 61 has two flattened surfaces 63 and 65 that are parallel but opposite to each other. The flattened surface 63 extends over about two third of the length of the upper surface of the rod 61 and is intended to cooperate with the set screw 55 when the same is driven in, to lock the rod 61 in the hole 53 and simultaneously prevent it from rotating in this hole 53. The other flattened surface 65 which is provided at the other end of the rod 61 is ⅛ inch deep and ½ inch long. A vertical hole is provided in the rod to receive a machine screw for positioning on this surface 65 a small, free rotating, ball bearing NYLON wheel 69.

As clearly shown in FIGS. 1, 3 and 4, the ball bearing NYLON wheel 69 extends close to the upper surface of the perpendicularly extending portion 49 of the L-shaped tube 45, in parallel relationship with respect to this upper surface. In use, the wheel 69 may be easily adjusted to any desired distance from the small opening 51 and therefore from the end mill 19 by merely sliding the rod 61 in the hole 53. After the rod 61 has been set in any desired position with respect to the end mill, the ball bearing NYLON wheel 69 may be used as a guide to help the operator to groove a line parallel to the edge of the lens at any desired distance therefrom (see FIG. 1) or to carve any desired carving guiding on the flat edge of the lens 3 to make it fit in a NYLON frame mounting (see FIG. 4).

The adjustable lens drilling guide 59 as shown in FIGS. 5 and 6 comprises an aluminum rod 71 provided with an upper, flattened surface 73. The aluminum rod 59 is intended to be inserted and set into the hole 53 in the guide holder 41 in the same manner as the rod 61 of the lens engraving or carving guide 57 is. A small plate 71 is mounted by an arm 77 perpendicularly extending from its back into a small slot provided at the end of the rod 71 which is opposite to the one inserted in the guide holder 41. A fixation screw 79 extending perpendicularly through the slotted end of the rod 71 and the arm 71 located in the slot, provides for an adjustable connection at any angle of the plate 75 with respect to the longitudinal axis of the rod 71. Due to the screw 79 the plate 71 is therefore adjustable in two ways. Angular adjustment of the plate 75 with respect to the longitudinal axis of the rod 71 can be achieved to accommodate the flat bevel finishing of the lenses 3. On the other hand, longitudinal adjustment of the rod 71 with respect to the guide holder 41 permits to adjust the distance between the hole to be drilled and the edge of the lens 3, as clearly shown in FIG. 5. The main advantage of this particular guide is to make the drilling operation much more easier because the operator has only to take care of the lateral position of the lens when the same bears on the plate 75. In practice, it is highly desired to drill half of the hole from one surface of the lens and subsequently reverse the lens to drill the other half of the hole from the opposite surface to avoid chips.

As can be understood, the small plate 75 actually permits to control the distance between the hole to be drilled and the edge of the lens, thereby improving the drilling precision.

In order to provide the operator with a permanently clean working surface, means connectable to a vacuum source may be provided for sucking out particles resulting from the drilling, carving or engraving operation through the small opening 51 from which projects the end mill 19.

Figure 2:
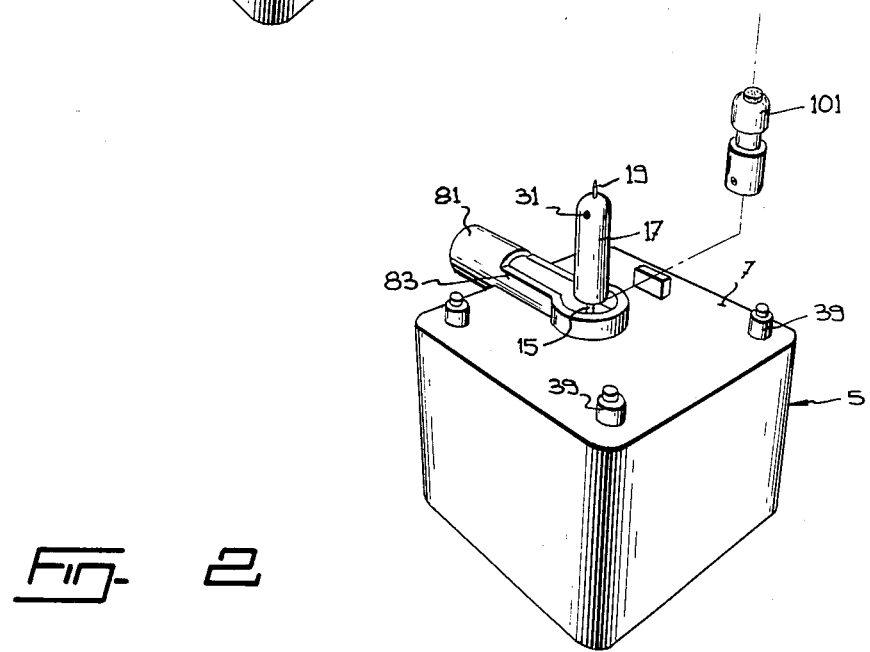
FIG. 2 is a perpsective view of the base of the apparatus shown in FIG. 1, with a tool holder and a polishing head.

As better shown in FIGS. 2 to 4, this suction means advantageously comprises a connector piece 81 extending outwardly from the base 5, and an enclosure wall 83 extending upwardly from the upper surface 7 of the base 5. As clearly shown in FIG. 2, the enclosure wall 83 surrounds the tool holder 17 and defines a conduct with the upper surface 7 of the base and the lower surface of the platform 35 when the same is mounted onto the base 3. The so formed conduct connects the lower, opened end of the vertically extending portion 47 of the L-shaped tube 45 mounted onto the platform 35 to the connector piece 81. In use, the vacuum plug of a standard vacuum cleaner 87 (see FIG. 3) may be connected to the connector piece 81. The vacuum cleaner 85 may also electrically connected to the base 5 so as to be electrically controlled therefrom.

As clearly shown in FIG. 4, operation of the vacuum source causes the particles resulting from the drilling, carving and engraving operation to be sucked in the L-shaped tube through the small opening 51 through which projects the end mill 19. The sucked in particles then pass through the conduct defined by the enclosure 83, the platform 35 and base 5 before reaching the vacuum plug of the vacuum cleaner 85.

The apparatus 1 previously disclosed can be electrically connected to any 110 volt AC regular supply 91. The electrical circuit of the apparatus 1 may include a permanent switch 93 in the base 5 and a temporary switch preferably incorporated in a foot pedal 95 for operating the motor whenever desired while keeping both hands free. The vacuum cleaner 85 may also be connected to a plug 97 provided for this purpose in the base 5 to provide an easy control to start and stop the vacuum. The operation of vacuum cleaner is preferably independent from the one of the motor to give additional freedom to the operator.

The apparatus according to the invention is therefore a multipurpose apparatus that can be used for either drilling, carving or engraving lenses. The base 5 of the apparatus may also be used as a support for a polishing head 101 as shown in FIG. 2. This head that can be made of brass and can support any kind of polishing felt or pad, may be mounted onto the shaft 15 in place of the tool holder 17 and can be used to remove scratches on the peripherical area of a plastic lens.

I claim:

1. An apparatus for drilling, engraving and carving ophthalmic lenses, said apparatus comprising:

(a) a base having an upper surface provided with an opening;
(b) an electrical motor mounted in the base for rotating a shaft passing through the opening of said base;
(c) a tool holder for detachably mounting a drilling, engraving or carving end mill onto the rotatable shaft above the upper surface of the base; and
(d) a working support detachably mounted on the upper surface of the base, said support including:

a platform provided with a central hole wide enough to give room to the tool holder;

means for detachably mounting the platform on, and parallel to, the upper surface of the base with the tool holder passing through the central hole of said platform;

a guide holder rigidly mounted onto the platform, said guide holder extending upwardly in parallel relationship with respect to the tool holder; and a L-shaped tube having one end fitted into the central hole of the platform and the other end rigidly connected to the guide holder, said tube having an upwardly extending portion with an internal diameter and a height sufficient to receive the tool holder while allowing the end mill mounted thereto to project outwardly from the tube through a small opening provided therein said tube also having a perpendicularly extending portion with an upper surface from which projects the end mill, said upper surface of said perpendicularly extending portion being useful as a support for a lens when the same is drilled, engraved or carved with the end mill.

2. The apparatus of claim 1, wherein the tool holder includes means for adjusting the height from which the end mill projects outwardly from the upper surface of the L-shaped tube and thereby the depth of the cut in the lens to be worked.

3. The apparatus of claim 2, further comprising:
(e) an adjustable lens engraving and carving guide, said guide comprising a free rotating NYLON wheel fixed to one end of a supporting rod detachably mounted on the guide holder, said rod extending at a short distance above and parallel to the perpendicularly extending portion of the L-shaped tube and being adjustable in length to position the NYLON wheel at any desired distance from the small opening from which projects the end mill.

4. The apparatus of claim 3, wherein the supporting rod is slidably mounted in a hole provided in the guide holder and means are provided for locking the rod in its hole after it has been adjusted with respect to the projecting end mill.

5. The apparatus of claim 4, wherein the NYLON wheel is axially parallel to the end mill and the supporting rod comprises keying means to prevent the rod from rotating in its hole.

6. The apparatus of claim 5, wherein the rod locking means consists of a screw set in a threaded hole intersecting the hole of the guide holder in which the rod is mounted.

7. The apparatus of claim 2, further comprising:
(f) an adjustable lens drilling guide, said guide comprising a small plate pivotably fixed to one end of a supporting rod detachably mounted on the guide holder, said small plate being angularly adjustable with respect to the rod, said rod extending at a short distance above and parallel to the perpendicularly extending portion of the L-shaped tube and being adjustable in length to position the small plate at any desired distance from the small opening from which projects the end mill.

8. The apparatus of claim 7, wherein the supporting rod is slidably mounted in a hole provided in the guide holder and means are provided for locking the rod in its hole after it has been adjusted with respect to the projecting end mill.

9. The apparatus of claim 8, wherein the small plate is in frontal position with respect to the end mill and the supporting rod comprises keying means to prevent the rod from rotating in its hole.

10. The apparatus of claim 9, wherein the rod locking means consists of a screw set in a threaded hole intersecting the hole of the guide holder in which the rod is mounted.

11. The apparatus of claim 2, wherein the guide holder is provided with a hole bored therethrough at a short distance above and parallel to the perpendicularly extending portion of the L-shaped tube, for receiving and positioning an adjustable lens drilling or lens engraving or carving guide.

12. The apparatus of claim 11, wherein the guide holder is provided with another threaded hole intersecting the guide receiving hole.

13. The apparatus of claim 11, further comprising:
means for holding the platform of the working support in spaced apart position with respect to the upper surface of the base; and
means connectable to a vacuum source for sucking out particles resulting from the drilling, carving or engraving operation through the small opening from which projects the end mill, and through the upwardly extending portion of the L-shaped tube.

14. The apparatus of claim 13, wherein said suction means comprises a connector piece extending outwardly from the base and an enclosure wall extending upwardly on the upper surface of said base, said enclosure wall surrounding the tool holder and defining a conduct with the upper surface of the base and the platform said conduct connecting the open end of the L-shaped tube mounted onto the platform to the connector piece.

15. The apparatus of claim 14, further comprising:
a plug for electrically connecting the vacuum source to the same electrical supply as the electrical motor; and
a foot pedal for controlling the supply of said motor.

16. The apparatus of claim 15, wherein the shaft on which is mounted the tool holder is the central shaft of the electrical motor.

17. The apparatus of claim 5, further comprising:
means for holding the platform of the working support in spaced apart position with respect to the upper surface of the base; and
means connectable to a vacuum source for sucking out particles resulting from the drilling, carving or engraving operation through the small opening from which projects the end mill, and through the upwardly extending portion of the L-shaped tube.

18. The apparatus of claim 17, further comprising:
a plug for electrically connecting the vacuum source to the same electrical supply as the electrical motor; and
a foot pedal for controlling the supply of said motor.

19. The apparatus of claim 9, further comprising:

means for holding the platform of the working support in spaced apart position with respect to the upper surface of the base; and means connectable to a vacuum source for sucking out particles resulting from the drilling, carving or engraving operation through the small opening from which projects the end mill, and through the upwardly extending portion of the L-shaped tube.

20. The apparatus of claim 19, further comprising:

a plug for electrically connecting the vacuum source to the same electrical supply as the electrical motor; and a foot pedal for controlling the supply of said motor.

* * * * *